(12) United States Patent
Lin et al.

(10) Patent No.: US 8,370,280 B1
(45) Date of Patent: Feb. 5, 2013

(54) COMBINING PREDICTIVE MODELS IN PREDICTIVE ANALYTICAL MODELING

(75) Inventors: Wei-Hao Lin, New York, NY (US); Travis H. Green, New York, NY (US); Robert Kaplow, New York, NY (US); Gang Fu, Kearny, NJ (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/252,063

(22) Filed: Oct. 3, 2011

Related U.S. Application Data

(60) Provisional application No. 61/507,841, filed on Jul. 14, 2011.

(51) Int. Cl.
G06F 15/18 (2006.01)
(52) U.S. Cl. .......................................................... 706/12
(58) Field of Classification Search .................... 706/45, 706/12
See application file for complete search history.

(56) References Cited

U.S. PATENT DOCUMENTS

| | | |
|---|---|---|
| 7,650,331 B1 | 1/2010 | Dean et al. |
| 2005/0234753 A1 | 10/2005 | Pinto et al. |
| 2007/0150424 A1 | 6/2007 | Igelnik |
| 2008/0097937 A1 | 4/2008 | Hadjarian |
| 2008/0154821 A1 | 6/2008 | Poulin |
| 2008/0270363 A1 | 10/2008 | Hunt et al. |
| 2008/0288209 A1 | 11/2008 | Hunt et al. |
| 2008/0288889 A1 | 11/2008 | Hunt et al. |
| 2008/0294372 A1 | 11/2008 | Hunt et al. |
| 2008/0294996 A1 | 11/2008 | Hunt et al. |
| 2008/0319829 A1 | 12/2008 | Hunt et al. |
| 2009/0006156 A1 | 1/2009 | Hunt et al. |
| 2009/0018996 A1 | 1/2009 | Hunt et al. |
| 2009/0106178 A1 | 4/2009 | Chu |
| 2010/0049538 A1 | 2/2010 | Frazer et al. |
| 2011/0145175 A1 | 6/2011 | Agarwal |
| 2011/0289025 A1 | 11/2011 | Yan et al. |
| 2011/0313900 A1 | 12/2011 | Falkenborg et al. |

OTHER PUBLICATIONS

R. Duin, "The Combining Classifier: to Train or Not to Train?", IEEE Pattern Recognition, 2002. Proceedings. 16th International Conference on, pp. 765-770.*
L. Denoyer et al., "Structured Multimedia Document Classification", ACM DocEng '03, Nov. 20-22, 2003, pp. 153-160.*
J. Platt et al., "Large Margin DAGs for Multiclass Classification", in Advances in neural information processing systems, S.A. Solla et al., eds., MIT Press 2000, pp. 1-7.*
Duchi, John, et al., "Boosting with Structural Sparsity", 2009, cs.berkeley.edu [online]. [Retrieved on Nov. 25, 2011]. Retrieved from the Internet: <URL: http://www.cs.berkeley.edu/~jduchi/projects/DuchiSi09d.pdf>, 41 pages.

(Continued)

*Primary Examiner* — Kakali Chaki
*Assistant Examiner* — Vincent Gonzales
(74) *Attorney, Agent, or Firm* — Fish & Richardson P.C.

(57) ABSTRACT

A method can include the actions of: receiving a feature vector, the feature vector including one or more elements; identifying an element type for each of the one or more elements; selecting, from a set of predictive models, a subset of one or more predictive models based on the element types and one or more performance indicators associated with each predictive model in the set of predictive models; processing the feature vector using the subset of predictive models, each predictive model of the subset of predictive models generating an output based on the feature vector to provide a plurality of outputs; and generating a final output based on the plurality of outputs. Other embodiments may include corresponding systems, apparatus, and computer program products for executing the method.

18 Claims, 6 Drawing Sheets

| Model | Runtime Error % | Number of Parameters | Computational Complexity | . . . . . . . | Accuracy (String Data) |
|---|---|---|---|---|---|
| Model A | 1% | 3 | Low | . . . . . . . . | High |
| Model B | 0.5% | 5 | Low | . . . . . . . . | Low |
| Model C | 3% | 3 | Medium | . . . . . . . . | Average |
| Model D | 0.2% | 2 | Low | . . . . . . . . | Average |
| Model E | 5% | 7 | High | . . . . . . . . | Average |
| Model F | 0.7% | 1 | Low | . . . . . . . . | Low |
| . | . | . | . | . | . |
| . | . | . | . | . | . |
| . | . | . | . | . | . |
| Model Z | 1% | 4 | Low | . . . . . . . . | High |

OTHER PUBLICATIONS

Duchi, John, et al., "Boosting with Structural Sparsity", Proceedings of the 26th International Conference on Machine Learning, Montreal, Canada, 2009, cs.berkeley.edu [online]. [Retrieved on Nov. 25, 2011]. Retrieved from the Internet: <URL: http://www.cs.berkeley.edu/~jduchi/projects/DuchiSi09a.pdf>, 8 pages.

"Google Prediction API (Labs)", Google.com, [Retrieved on May 4, 2011]. Retrieved from the Internet: <URL: http://code.google.com/apis/predictl>, 21 pages.

Predictive Dynamix Inc., Predictive Modeling Technology, Predictive Dynamix, Inc., 2003-2004, 5 pages.

Duin, P.W. Robert, et al., Experiments with Classifier Combining Rules, J. Kittler and F. Roli (Eds.): MCS 2000, LNCS 1857, pp. 16-29, 14 pages.

Barbieri, Maddalena Maria, et al. Optimal Predictive Model Selection, The Annals of Statistics, 2004, vol. 32, No. 3, 29 pages.

Yuan, Zheng et al., Combining Linear Regression Models: When and How? Dec. 2004, 27 pages.

Evaluating Predictive Models, 36-350, Data Mining, Principles of Data Mining, Chapter 7; Berk chapter 2, Oct. 26 and 28, 2001, 22 pages.

Chandra, Tushar, "Sibyl: a system for large scale machine learning" Keynote I PowerPoint presentation, Jul. 28, 2010, ladisworkshop.org [online]. [Retrieved on Jan. 25, 2011]. Retrieved from the Internet: <URL: http://ladisworkshop.org/sites/default/files/LADIS%202010%20actual.pdf>, 43 pages.

R-Project web pages, 190 pp. [online]. [Retrieved on May 18, 2010]. Retrieved from the Internet: <URL: http://www.r-project.org/>, 190 pages.

Uclassify web pages, [online] [Retrieved on May 18, 2010]. Retrieved from the Internet: <URL: http://www.uclassify.com/>, 16 pages.

Zementis web pages [online]. [Retrieved on May 18, 2010]. Retrieved from the Internet: <URL: http://www.zementis.com/>, 34 pages.

PMML 4.0 General Structure of a PMML Document, [online] [Retrieved on May 1, 2011]. Retrieved from the Internet: <URL: dmg.org/v4-0-1/General Structure.html>, 9 pages.

Predictive Model Markup Language, [online] [Retrieved on May 1, 2011], Retrieved from the Internet: <URL:http://en.wikipedia.org/wiki/Predictive_Model_Markup_Language>, 7 pages.

Developer's Guide—Google Prediction, [online] [Retrieved on May 6, 2011], Retrieved from the Internet: ,URL: http:www.google.com/.../developer-guide.htm>, 7 pages.

Makhtar, Mokhairi, et al., "Predictive Model Representation and Comparison: Towards Data and Predictive Models Governance", Computational Intelligence (UKCI), 2010 UK Workshop: Sep. 8-10, 2010; 6 pages.

Netuitive Announces Amazon EC2 Integration for Hybrid Cloud Performance Management [online] [retrieved on Apr. 26, 2011], Retrieved from the Internet: <URL: marketwire.com/.../Netuitive-Announc...>, 2 pages.

Google Apps Script Overview [online] [retrieved on May 6, 2011], Retrieved from the Internet: <URL: code.google.com/.../guide.html>, 4 pages.

Creative Commons Attribution-Share Alike 3.0 Unported, Cross-validation (statistics)., http://creativecommons.org., pp. 1-5.

Creative Commons Attribution-Share Alike 3.0 Unported, Winnow (algorithm)., http://creativecommons.org., 2 pages.

Bengio, Yoshua, Continuous Optimization of Hyper-Parameters, C.P. 6128 Succ. Centre-Ville, Montreal, Quebec, Canada, H3C 3J7, 7 pages.

Daelemans, Walter et al., Combined Optimization of Feature Selection and Algorithm Parameters in Machine Learning of Language, CNTS Language Technology Group, University of Antwerp, Universiteitsplein 1, B-2610 Antwerpen, Postdoctoral research of the Fund for Scientific Research, Flanders, Belgium, 12 pages.

C.E. Rasmussen & C.K.I. Williams, Gaussian Processes for Machine Learning, Model Selection and Adaptation of Hyperparameters, Chapter 5, The MIT Press, 2006 Massachusetts Institute of Technology. [Retrieved from the Internet on Oct. 18, 2011]. Retrieved from the Internet: <URL: http://www.gaussianprocess.org/gpml/chapters/RW5.pdf, 24 pages.

Potrera, Cosmin Marian, et al.; DCFMS: "A chunk-based distributed file system for supporting multimedia communication", Computer Science and Information (FedCSIS), 2011 Federated Conference on Publication Year: 2011, pp. 737-741.

McDermott, et al.: "Generating models of mental retardation from data with machine learning"; Knowledge and Data Engineering Exchange Workshop, 1997. Proceedings Digital Object Identifier: 10,1109/KDEX.1997.629850 Publication Year: 1997, pp. 114-119.

English, et al.; "A grammatical approach to reducing the statistical sparsity of language models in natural domains", Acoustics, Speech, and Signal Processing, IEEE International Conference of ICASSO'86, vol. 11, Digital Object Identifier: 10.1109/CASSO.1986.1168955 Publication Year: 1986, pp. 1141-1144.

Altincay, et al.; Post-processing of Classifier Outputs in Multiple Classifier Systems:, 2002; Springer-Verlag Berlin Heidelberg; Lecture Notes in Computer Science, 2002, vol. 2364; pp. 159-168.

Altincay, et al.: "Why Does Output Normalization Create Problems in Multiple Classifier Systems?" 2002; IEEE; 16th International Conference on Pattern Recognition, Proceedings; vol. 2; pp. 775-778.

Stemmer, Georg et al.; "Comparison and Combination of Confidence Measures"; 2006; Springer-Vergal Berlin Heidelbreg; Lecture Notes in Computer Science 2006, Volum 2448; pp. 181-188.

Altincay, et al., "Undesirable Effects of Output Normalization in Multiple Classifier Systems", 2002; Elsevier Science B.V.; Pattern Recognition Letters 24 (2003); pp. 1163-1170.

Delany, et al., Generating Estimates of Classification Confidence for a Case-Based Spam Filter'; 2005; Springer-Vergal Berlin Heidelberg; Lecture Notes in Computer Science, 2005, vol. 3620, pp. 177-190.

Dag Consistent Parallel Simpulation: A Predictable and Robust Conservative Algorithm, Wenton Cai et al.; Parallel and Distributed Simulation, 1997; Proceedings, 11th Workshop on Digital Object Identifier; 10.1109/PADS.1997.594604; pp. 178-181.

Stochastic Models for the Web Graph, Kumar, R. et al.; Foundations of Computer Science, 2000; Proceedings, 41st Annual Symposium on Digital Object Identifier; 11.1109/SFCS.2000.892065; pp. 57-65.

Explicit Modeling of Mode Transition Constraints for Model Predictive Control, Kobayashi, K. et al.; SICE Annual Conference, 2008 Digital Object Identifier: 10.1109/SICE.2008.4654911; pp. 1569-1574.

Research on Prediction Technique of Network Situation Awareness, Wang, et al.; Cybernetics and Intelligent Systems, 2008 IEEE Conference on Digital Object Identifier: 10.1109/ICCIS.2008.4670783; pp. 570-574.

T. Dietterich, Ensemble Methods in Machine Learning:, J. Kittler and F. Foli (Eds.), MCS 2000, pp. 1-15.

Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>, 1 page.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.

Giacinto et al., "An approach to the automatic design of multiple classifier systems," Pattern Recognition Letters 22 (2001) 25±33.

\* cited by examiner

500

| Model | Runtime Error % | Number of Parameters | Computational Complexity | . . . . . . . | Accuracy (String Data) |
|---|---|---|---|---|---|
| Model A | 1% | 3 | Low | . . . . . . . | High |
| Model B | 0.5% | 5 | Low | . . . . . . . | Low |
| Model C | 3% | 3 | Medium | . . . . . . . | Average |
| Model D | 0.2% | 2 | Low | . . . . . . . | Average |
| Model E | 5% | 7 | High | . . . . . . . | Average |
| Model F | 0.7% | 1 | Low | . . . . . . . | Low |
| . | . | . | . | . | . |
| . | . | . | . | . | . |
| . | . | . | . | . | . |
| Model Z | 1% | 4 | Low | . . . . . . . | High |

*FIG. 5*

COMBINING PREDICTIVE MODELS IN PREDICTIVE ANALYTICAL MODELING

PRIORITY CLAIM

This application claims priority under 35 USC §119(e) to U.S. Patent Application Ser. No. 61/507,841, filed on Jul. 14, 2011, the entire contents of which are hereby incorporated by reference.

TECHNICAL FIELD

This specification relates to predictive modeling technology.

BACKGROUND

Predictive modeling generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Examples of predictive models include Naive Bayes classifiers, k-nearest neighbor classifiers, support vector machines, and logistic regression techniques, for example. Typically, a predictive model is trained with training data that includes input data and output data that mirror the form of input data that will be entered into the predictive model and the desired predictive output, respectively. The amount of training data that can be required to train a predictive model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection. In some cases, output from a number of distinct predictive models can be combined to achieve a superior prediction.

SUMMARY

In general, one aspect of the subject matter described in this specification can be embodied in methods that include the actions of: receiving a feature vector, the feature vector including one or more elements; identifying an element type for each of the one or more elements; selecting, from a set of predictive models, a subset of one or more predictive models based on the element types and one or more performance indicators associated with each predictive model in the set of predictive models; processing the feature vector using the subset of predictive models, each predictive model of the subset of predictive models generating an output based on the feature vector to provide a plurality of outputs; and generating a final output based on the plurality of outputs. Other embodiments of this aspect include corresponding systems, apparatus, and computer program products.

In the foregoing aspect, generating a final output can include: defining a combining technique based on the subset of predictive models; and combining the plurality of outputs according to the combing technique. The combining technique can include a fixed output combining rule and/or a trained combining rule. In some examples, the combining technique is defined as a directed acyclic graph.

These and other embodiments can optionally include one or more of the following features: the final output is generated using a decision maker, the decision maker receiving the plurality of outputs; the plurality of outputs are combined to define a second feature vector, the second feature being processed by a final predictive model to generate the final output; selecting a subset of one or more predictive models includes comparing respective performance indicators (e.g., accuracy metrics) associated with each predictive model of the set of predictive models, the respective performance indicators being selected for comparison based on the element types; processing the feature vector includes submitting at least a portion of the feature vector to each predictive model of the subset in parallel; processing the feature vector includes submitting the entire training dataset to each untrained predictive model of the subset; and processing the feature vector includes submitting elements of a first data type to a first predictive model of the subset and submitting elements of a second data type to a second predictive model of the subset.

Particular embodiments of the subject matter described in this specification can be implemented so as to realize one or more of the following advantages. Predictive model combination techniques can be further enhanced by selecting a subset of predictive models for combination that are expected to perform well under identified conditions. Further, by selectively reducing the number of predictive models to be combined, computational resources can be conserved.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 illustrates an example database for storing predictive model performance indicators.

Like reference numbers and designations in the various drawings indicate like elements.

DETAILED DESCRIPTION

Figure 1:
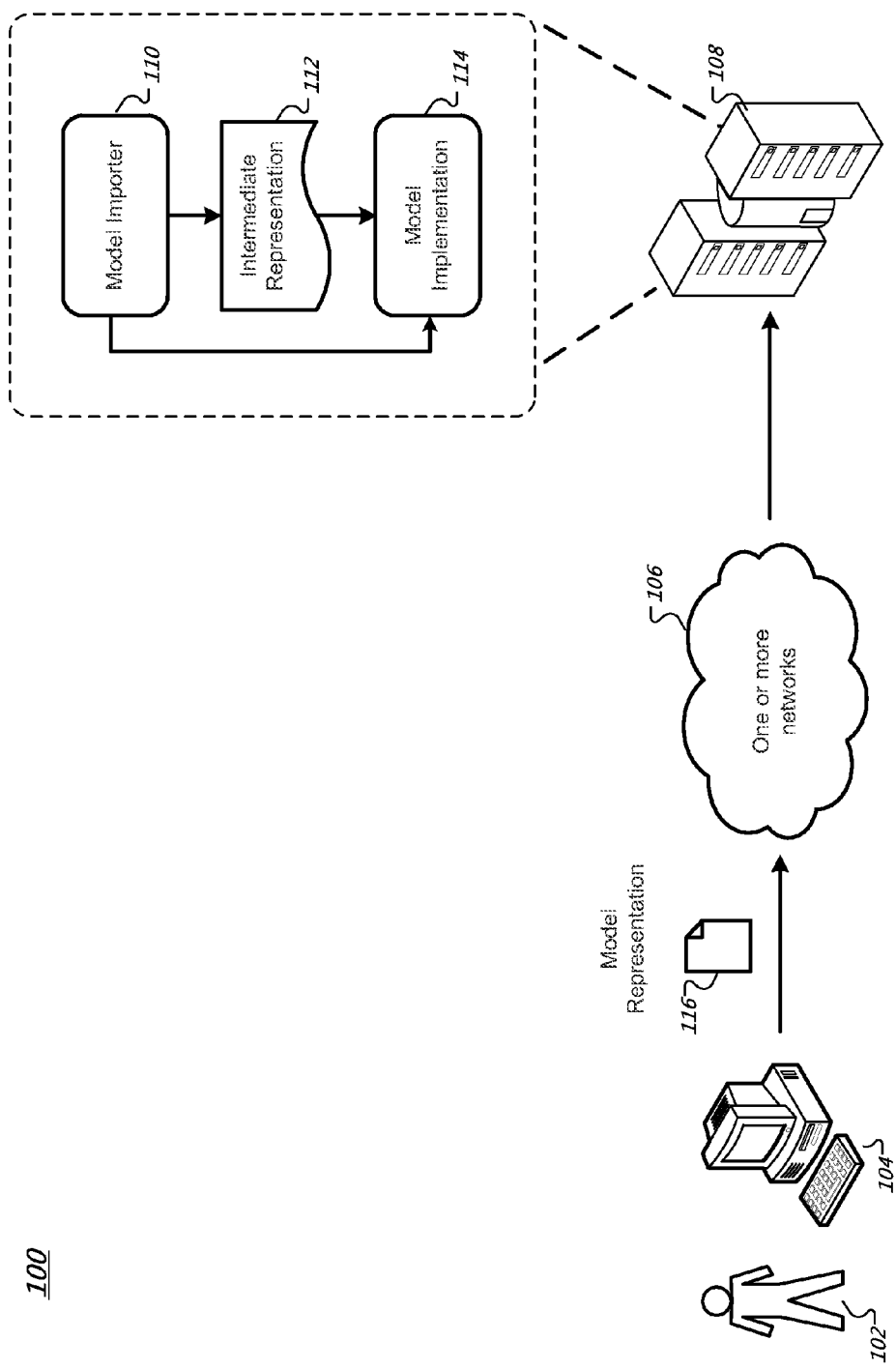
FIG. 1 illustrates the importation of a predictive model into an example system.

Generally, a predictive model can be considered a logical or mathematical type construct operable to predict a future event or outcome based on historical facts or data. In some examples, a predictive model (or "model") is considered a categorical model if its predictive outcomes are categories. In some examples, a predictive model is considered a regression model if its predictive outcomes are numeric values. In some cases, output from a number of distinct predictive models can be combined to achieve predictions that can be more accurate to predictions provided by individual models. Such predictions can be further improved by selecting a specific subset of predictive models for combination from a set of available models. For example, a subset can include predictive models that are particularly well suited for processing certain types of data. Subsets of predictive models, however, can be selected based on any number of suitable factors, as discussed in further detail below.

In some implementations, a predictive model can be constructed (or "trained") using a training dataset in conjunction with a machine learning algorithm. Training datasets can include any number of training examples (e.g., tens, hundreds, thousands, or millions of examples) embodying a patterned occurrence. Each training example can include a number of elements (for example, observed features) related to a known outcome (e.g., a category or a numeric value). In some examples, the observed feature(s) for each training example can be considered a feature vector. The dimensionality of a feature vector can be equal to, or less than, the number of observed features included therein.

In some implementations, the accuracy of the predicted outcomes ultimately generated by a predictive model can be augmented by increasing the number of training examples and/or the number of features per training example. Observed features and/or outcomes included in the training examples can be provided in any suitable form or data type. For example, observed features and/or outcomes can be provided as strings of text or numerical values of any suitable length or complexity.

In some implementations, feature vectors and associated outcomes of a training dataset can be organized in tabular form. For example, the training dataset illustrated by TABLE 1 includes of a number of training examples related to categorization of email messages as SPAM or NOT SPAM. As shown, the feature vector (which, in this example, includes a single observed feature) of each training example includes an email message subject line, and the related outcome is a category that indicates whether or not the email message is spam. In some examples, such training datasets can be stored in one of various suitable electronic data formats (e.g., comma-separated-values or "CSV", delimiter-separated values or "DSV", tab-separated values, as well as various markup and programming languages).

TABLE 1

| OBSERVED FEATURES | RELATED OUTCOME |
|---|---|
| "You have won $$$" | "SPAM" |
| "Lose weight fast!" | "SPAM" |
| "Lowest interest rates ever!" | "SPAM" |
| "How are you?" | "NOT SPAM" |
| "Trip to New York" | "NOT SPAM" |

In some implementations, a training dataset can be applied to a selected machine learning algorithm to train a predictive model. More specifically, the machine learning algorithm can train a predictive model by systematically analyzing the applied training dataset and defining an inferred function that "fits" the training data. The trained predictive model can be representative of the training dataset and operable to map a feature vector to a predictive outcome according to the inferred function.

An inferred function fitted to a training dataset can include any suitable number or type of constants, parameters, and/or variables, which can be defined by the machine learning algorithm. In some examples, the inferred function is provided in the form of a mathematical function or a logical function. In some implementations, mathematical functions can be provided in the form of a continuous function, such as suitable polynomial functions, exponential functions, logarithms, etc. In some implementations, mathematical functions can be provided in the form of a discontinuous function, such as suitable piecewise functions, step functions, etc. Logical functions can also be provided in various suitable forms, such as two-valued logical functions (e.g., binary logic), fuzzy logical functions, Bayesian logical functions, etc.

As described above, a machine learning algorithm can include a number of ordered steps or operations for analyzing training data and generating a predictive model. In some implementations, a machine learning algorithm can be embodied by one or more computer programs operable to receive input and emit output. For example, the computer program(s) can include a number of instructions executable by a computer processor to perform one or more of the following operations: receive a training dataset stored in a suitable electronic data format; implement the machine learning algorithm to generate a predictive model that is representative of the training dataset; and output the predictive model in a suitable computer readable and executable format.

In some implementations, a training dataset can be modified and submitted in a modified form to a predictive model. For example, one or more bootstrapping operations can be applied to the training dataset. The bootstrapping operations can include assigning measures of accuracy or importance to respective training examples in the training dataset. For instance, referring to TABLE 1, if "Lowest interest rates ever!" is a particular good illustration of spam, this training example can be attributed a higher measure of accuracy than other training examples. In this manner, training of the predictive model to which this training example is submitted can be purposefully biased.

In some examples, boosting operations can be applied to the training dataset. The boosting operations can include training a set of predictive models in series and re-weighting the training dataset between training iterations based on output from an earlier predictive model. For example, training examples that were particularly difficult to process in a first predictive model can be given a greater weight than other training examples in the training dataset, such that a second predictive model receiving the modified dataset can become an "expert" in domains where the first predictive model has proven to be relatively weak.

After a predictive model has been trained, queries can be submitted to the predictive model. In some implementations, queries can be similar in form to training examples: In some examples, a query can include a feature vector having the same (or fewer) observed features, but not include the related outcome. In response to a query, the predictive model can either determine the closest category for the submitted query (if it is a categorical model) or to estimate a value for the query (if it is a regression model), and return the predicted category or value.

A predictive model can be expressed as a model representation to enable models to be exchanged between systems. In some implementations, the model representation can be provided in the form of a Predictive Model Markup Language (PMML) document. PMML is an eXtensible Markup Language (XML)-based language. Other model representations are also possible such as, for example, formatted or unformatted text. The PMML specification is an XML schema. Instances of models are XML documents that conform to such a schema. A PMML document can represent more than one model. Generally speaking, a PMML document can contain some or all of the information described in TABLE 2. The PMML document can also contain information not described in TABLE 2.

TABLE 2

| SECTION | DESCRIPTION |
|---|---|
| Header | The header contains general information about the PMML document, such as copyright information for the model, its description, and information about the application used to generate the model. |
| Data Dictionary | The data dictionary contains definitions for all the possible fields used by the model. |
| Data Transformations | The data transformations specify mappings of user data into different forms to be used by the model. |
| Model | Contains the definition of the particular model. |
| Mining Schema | The mining schema lists all fields used in the model. This can be a subset of the fields as defined in the data dictionary. It contains specific information about each field, such as the field's name and what should happened when there is a missing value. |
| Targets | Targets specify post-processing for the predicted value. |
| Output | The output provides a name any output fields expected from the model, including the predicted value. |

FIG. 1 illustrates the importation of a predictive model into an example system 100. As shown, a user 102 interacts with a client computing device 104 (or "client") to access a model importer 110 web application for importing a model representation 116. A web application executes on one or more server computing devices (or "servers") that are accessed over a network 106, such as the Internet, by the user 102. Software that implements the model importer 110 executes on one or more servers in a data warehouse 108, for instance, that houses hundreds or thousands of servers. The user 102 can interact with the model importer 110 by using a web browser or other software that executes on the client 104. User data files such as model representations (e.g., model representation 116) that are accessed, modified or created by the model importer 110 can be stored in repositories that are accessible to the servers. The model importer 110 can provide a graphical user interface (GUI) to the client 104 by sending the client 104 Hypertext Markup Language (HTML) documents or other information that can be used to render the GUI.

The model importer 110 interprets the model representation 116 and either emits an intermediate representation 112 or a model implementation 114. By way of illustration, if the model representation 116 is a PMML document, an XML parser can be used to translate the document into the intermediate representation 112. The intermediate representation 112 is an internal representation of the model representation 116 from which a model implementation 114 can be generated or selected (if the implementation has already been generated). In some implementations, the intermediate representation 112 is a data structure that encodes the information of the model representation 116 to enable for rapid generation or selection of a model implementation 114.

A model implementation 114 can be generated or selected directly from the model representation 116 or from the intermediate representation 112. The model implementation 114 is one or more computer programs that execute on one or more servers. In some implementations, the type of model implementation 114 is chosen based on the user's status, available resources, or both. This is described further below with reference to FIG. 2. For example, the model implementation can be a computer program that is designed to execute on a single server or it can be designed to execute on multiple servers. An example of the latter approach is a model implemented as a map-reduce system. A map-reduce system includes application-independent map modules configured to read input data and to apply at least one application-specific map operation to the input data to produce intermediate data values. The map operation is automatically parallelized across multiple servers. Intermediate data structures are used to store the intermediate data values. Application-independent reduce modules are configured to retrieve the intermediate data values and to apply at least one application-specific reduce operation to the intermediate data values to provide output data. The map-reduce system is described further in U.S. Pat. No. 7,650,331, entitled "System and method for efficient large-scale data processing," which is incorporated by reference herein in its entirety.

Figure 2:
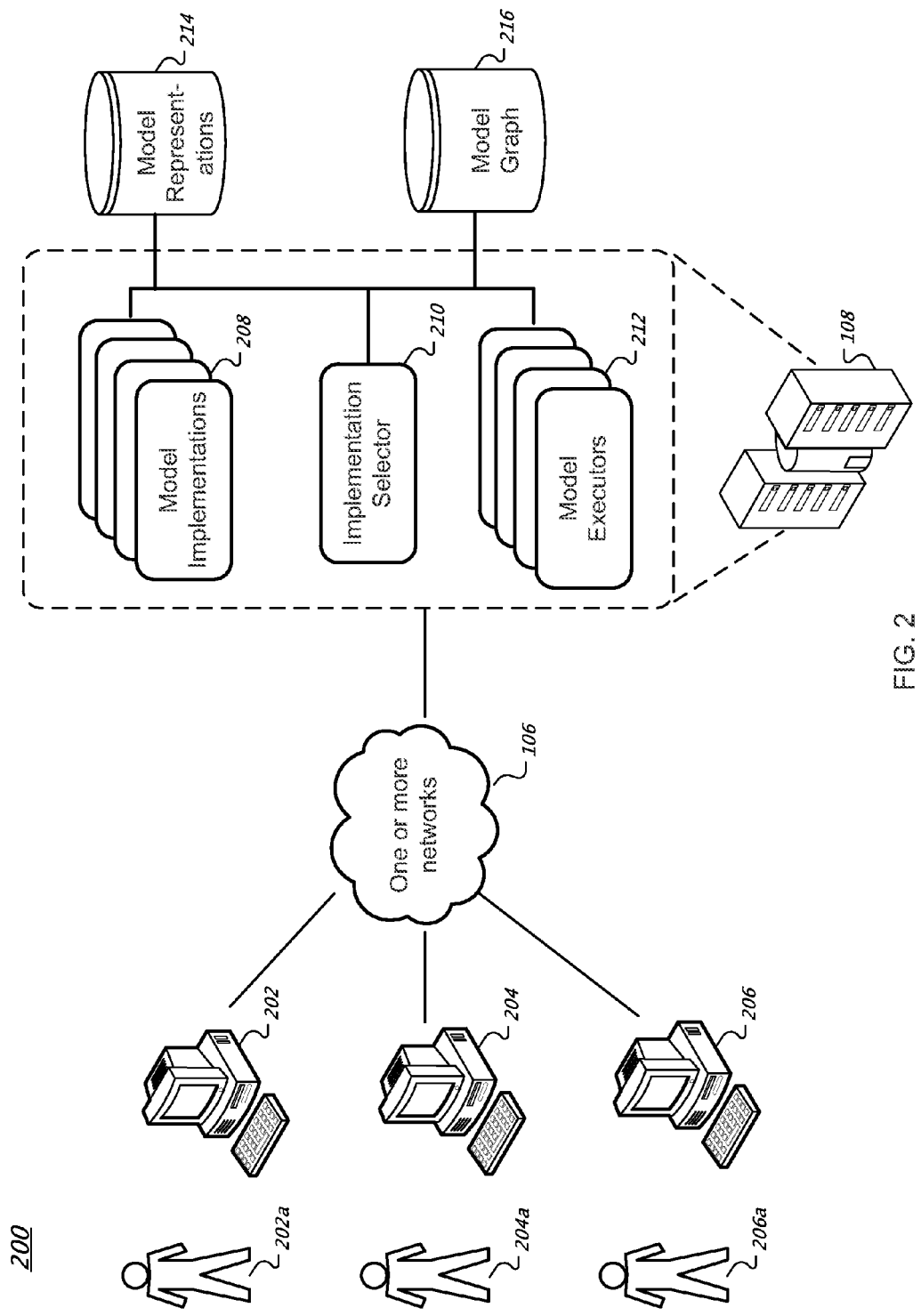
FIG. 2 illustrates an example predictive modeling system.

FIG. 2 illustrates an example predictive modeling system 200. The system 200 includes one or more clients (clients 202, 204 and 206) that can communicate through one or more networks 106 with a collection of remote servers, such as servers deployed in a data center 108 or in different geographic locations. A given server includes one or more data processing apparatus. The servers can communicate with each other and with storage systems (e.g., model representation storage system 214 and model graph storage system 216) at various times using one or more computer networks or other communication means. For example, the servers in the data center 108 can be coupled to an intranet. A computer program can execute on a single server or, alternatively, the program can be organized into components that execute on multiple servers. There can be more than one instance or copy of a given computer program executing on the collection of servers at any given time. Multiple copies of a computer program that implements a model implementation or a model executor, for instance, can be executing at the same time on one or more servers.

Computer programs can be executed in parallel by the servers. Two computer programs are executed in parallel if they are executed on different servers and if at least a portion of their execution occurs at the same time. For example, assume that computer program A is executed on server S1 and computer program B is executed on server S2. If some period of time exists where program A and B are both being executed, then the programs are executed in parallel.

The servers execute computer programs that implement model implementations 208, an implementation selector 210, and model executors 212. The model executors 212 can use the implementation selector 210 to select model implementations 208 to execute based on various factors. A given predictive model (e.g., a support vector machine) can have a number of different possible predictive model implementations. In some implementations, predetermined predictive model implementations can be provided. For example, there can be small, medium and/or large implementations. A small predictive model implementation uses the resources of a single server, a medium predictive model implementation has a parallelized implementation (e.g., a map-reduce predictive model implementation) that uses the resources of N servers, and a large implementation has a parallelized implementation that uses the resources of P servers, where P>N. In some examples, P and N can be varied dynamically based on the available resources of the system 200 (e.g., the number of a servers that are available to execute a portion of the model implementation) and other factors. Some predictive model implementations can also perform pre-processing (see "data transformations" in TABLE 2) and post-processing (see "targets" in TABLE 2) in parallel. Predictive model training and prediction can be performed faster using predictive model implementations that utilize more servers than those that utilize fewer servers. In some implementations a user can choose which predictive model implementation is used.

The implementation selector 210 is used by the predictive model importer 110 (FIG. 1) or by the model executors 212 to select a specific implementation for an imported model representation based on user properties (e.g., the user's status), available resources, other information, or suitable combinations of such factors. (Model executors 212 are described further below.) Users (e.g., users 202a, 204a, and 206a) can each be associated with a respective status to indicate the type of user they are such as, for example, "very important user," "test user," and so on. Other types of user status are also possible. A model implementation can be selected based on the user's status. Users who are very important, for instance, can be assigned a model implementation that executes faster than model implementations for test users. In various implementations, larger model implementations (e.g., medium or large) are selected for very important users whereas smaller model implementations (e.g., small) are selected for users of lesser status.

Other user properties can include the amount of system 200 resources the user has consumed over a given time period, the time of day the user typically trains or queries their models, and the amount of money the user has paid to utilize the system 200. The amount of resources consumed can be—for one or more servers—the amount of computer memory consumed, the amount of CPU processing time consumed, the amount of information sent or received on a computer network, or combinations of these. In some implementations, users are assigned resource quotas and model implementations (e.g., small, medium and large) are selected based the amount of unused resources according to the user's quota. For example, a user can configure the system to provide the fastest model implementation that is estimated not to exceed the user's unused resource quota.

The time of day that a user typically trains or queries their models can, in some implementations, determine the speed of the model implementation used. During off peak hours faster model implementations can be used, for example. The amount of money a user has paid to utilize the system 200 can be a flat rate, or based on actual usage. In the former case, the user can pay for a level or grade of service which determines the size of model implementations that are available to them. In the latter case, the user is charged for the system 200 resources they consume so that if the user (or the system 200) selects larger model implementations, the user will be charged accordingly. In some implementations, the user's remaining account balance determines which model implementations (e.g., small, medium and large) are selected based an estimate of what the user will be charged for the usage. That is, the largest model implementation possible is selected that is not estimated to result in a negative account balance based on system 200 usage.

Figure 3:
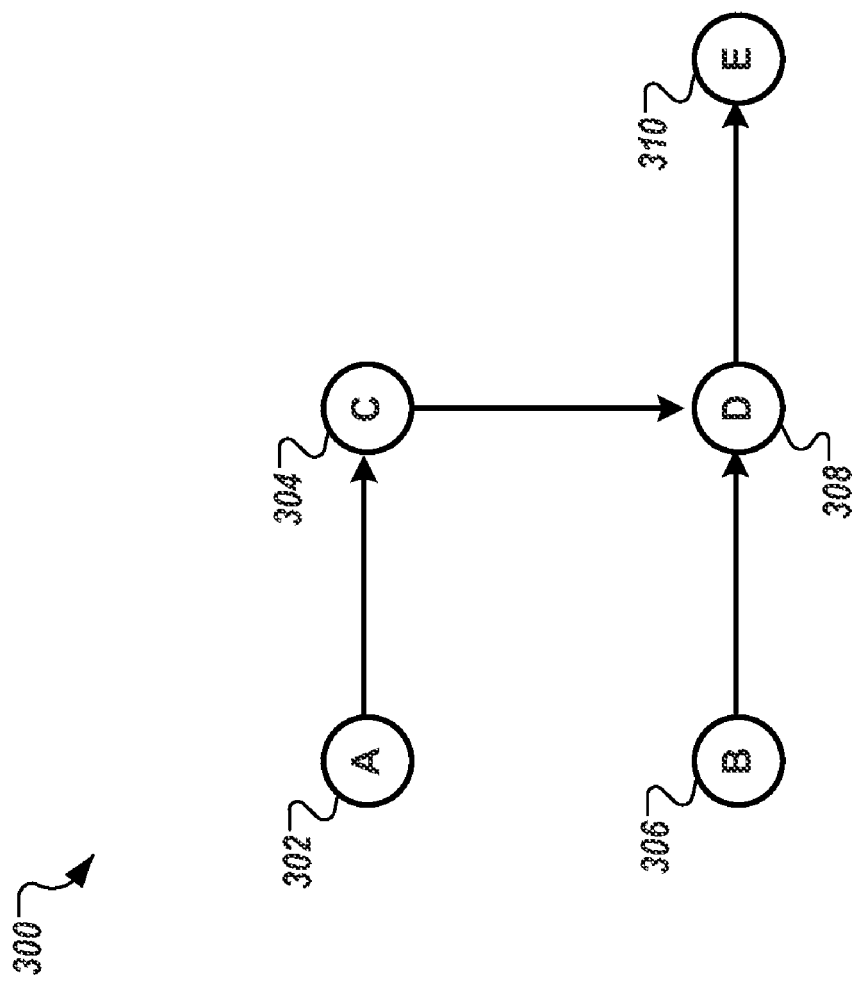
FIG. 3 illustrates an example directed graph for use in executing predictive models.

Model executors 212 execute the model implementations according to an order prescribed by respective directed graphs (e.g., directed acyclic graphs) assigned to the model executors. A directed graph or digraph is a pair G=(V, E) where V is a set nodes and E is a set of ordered pairs of nodes or "edges". An edge e=(x, y) is considered to be directed from node x to node y; y is called the head and x is called the tail of the edge; y is said to be a direct successor of x, and x is said to be a direct predecessor of y. If a path made up of one or more successive edges leads from x to y, then y is said to be a successor of x, and x is said to be a predecessor of y. FIG. 3 illustrates an example directed graph 300 for use in executing predictive models. Directed graph 300 contains nodes A 302, B 306, C 304, D 308 and E 310. The edges of the graph 300 are indicated by directed lines between nodes and are as follows: (A, C), (B, D), (C, D), and (D, E).

In various implementations, each node of the graph 300 is associated with a model implementation. A model executor executes model implementations by following the edges in the graph 300. The prediction output of a model implementation associated with a direct predecessor serves as input to the model implementation associated with the direct successor. In this example, the output of the model implementation associated with node A 302 serves as input to the model implementation associated with node C 304. The input to the model implementation associated with node D 308 is the output of the model implementations associated with nodes C 304 and B 306. The output of the model implementation associated with node D 308 serves as input to the model implementation associated with node E 310. The model executor can utilize dependencies in the graph to determine whether model implementations can be executed in parallel. For example, the execution of the model implementation associated with node B 306 can occur in parallel with the execution of the model implementations associated with node A 302 and/or node C 304, because there are no edges between node A 302 and node B 306, or between node C 304 and node B 306.

Figure 4:
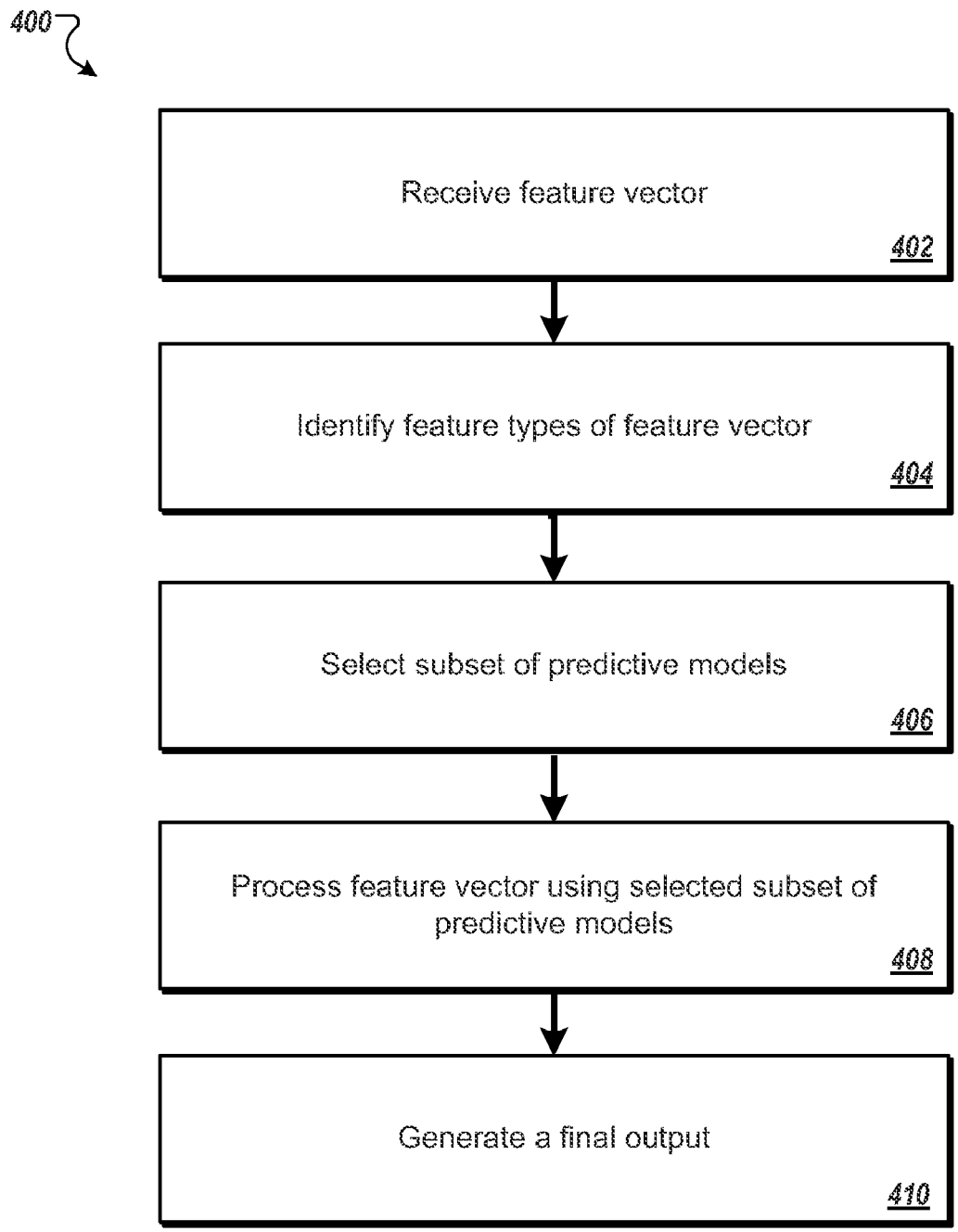
FIG. 4 illustrates an example process for combining predictive models.

As mentioned above, predictive modeling results can be improved by combining various independent predictive models. FIG. 4 illustrates an example process 400 for combining predictive models. According to process 400, a feature vector can be received (402). For example, a user may submit a query including the feature vector to a server. As described above, the feature vector can include any number of features (or elements) that are related to a patterned occurrence.

In some implementations, once received, one or more attributes or properties describing the feature vector can be identified. For instance, according to process 400, the type (e.g., data type, such as binary, string, real value, etc.) of each feature included in the feature vector can be identified (404). Other suitable attributes describing the received feature vector can also be determined, such as the dimensionality of the feature vector.

A subset of one or more predictive models can be selected from a set of predictive models (406). In some implementations, the subset of predictive models is selected based on the identified types of features included in the received feature vector and one or more performance indicators associated with the predictive models. For example, respective performance indicators corresponding to a set of predictive models can be compared to determine which predictive models should be selected. In this example, a performance indicator can be considered any suitable quantitative measure (e.g., a metric), qualitative designation (e.g., labels such as "highly accurate", "robust", etc.) or ranking which describes the performance of a predictive model. In some implementations, performance indicators can include: accuracy metrics (e.g., predictive error percentages, confidence scores, etc.) that reflect the tendency of a predictive model to output correct or erroneous predictive outcomes, stability metrics (e.g., runtime error percentages) that reflect the tendency of a predictive model to successfully reach a prediction, flexibility metrics (e.g., number of parameters, highest degree of variable terms, etc.) that reflect the ability of a predictive model to glean complicated patterns from training data having several features per example, complexity metrics (e.g., average number of required computations) that reflect the computational effort required to execute a predictive model, and other comparable metrics applicable to statistical models. Certain performance indicators can be generated or updated based on data collected after a predictive model has been executed. For example, accuracy, stability, and complexity metrics can be generated or updated after execution of a predictive model.

In some implementations, a database including performance indicators for a plurality of available predictive models can be provided. FIG. 5 illustrates an example database for storing predictive model performance indicators. The example predictive model performance indicators include "Runtime Error %", "Number of Parameters", "Computational Complexity", and "Accuracy (String Data)" for example predictive Models A-Z. Database 500 can be utilized to compare performance indicators corresponding to various predictive models.

In some implementations, a subset including a predefined number of predictive models that are expected to perform well, based on the identified types of features included in the feature vector, is selected by comparing relevant performance indicators. For example, a subset including Model A and Model Z can be selected from the set of predictive Models A-Z when a received features vector includes a majority of string type features (see FIG. 5). In some implementations, predictive models expected to predict either very similar or very different outcomes can be selected. In some implementations, each selected predictive model can be of the same type (having respective hyper parameter values) or of a different type, compared to other selected models in the subset.

The feature vector can be processed using the selected subset of predictive models to provide a plurality of outputs (408). In some implementations, each predictive model of the subset is operable to generate a respective output based on the feature vector. In some examples, the feature vector is partitioned and respective portions are submitted to each predictive model of the selected subset. For instance, features of a first type (e.g., string data) can be submitted to a first predictive model and features of a second type (e.g., binary data) can be submitted to a second predictive model. This can be advantageous when an occurrence is described in different domains (e.g., time and temperature or color and size). In some implementations, random portions of a partitioned feature vector can be submitted to the respective predictive models of the subset, such that any of the models has an equal chance to receive a particular feature. In some examples, the entire feature vector can be submitted to each selected predictive model of the subset.

A final output can be generated based on the plurality of outputs generated by the selected subset of predictive models (410). For example, in some implementations, the plurality of outputs can be combined to determine a final output. In some implementations, the plurality of outputs can be combined according to a suitable fixed output combining rule or a trained combining rule. Fixed output combining rules can include one or more operations for comparing and/or integrating output from multiple predictive models. In some examples, fixed output combining rules can be used in conjunction with categorical predictive models. For example, Majority Voting can be considered a fixed combining rule. In Majority Voting, a vote is attributed to each category predicted by a subset of predictive models (where each predictive model of the subset is provided an identical query). The category receiving a majority of votes is considered the final predicted outcome. Other comparable fixed combining rules (e.g., the Maximum rule, the Median rule, the Mean, rule, the Minimum rule, the Product rule, the Borda Count rule, etc.) can also be used for combining output from predictive models.

Trained combining rules can include one or more operations for aggregating query-based output from a subset of selected predictive models (i.e., first layer predictive models) to form an intermediate query. The intermediate query can then be posed to one or more second layer predictive models. The second layer predictive models can be capable of predicting an outcome based on predictions provided by the first layer predictive models. For example, an intermediate training dataset can be provided for training the second level predictive models (e.g., via a machine learning algorithm). The intermediate training dataset can incorporate feature vectors which include example predictive output from the first level predictive models.

In some examples, a suitable combining technique for generating a final output may be defined based on the subset of predictive models. In some examples, the combining technique can include a combining rule (e.g., a fixed or trained combining rule) that is most favorable based on types of predictive models that have been selected. For example, if each selected predictive model of the subset is operable to provide a posterior probability estimate for each possible outcome, the Mean or Median rules can be considered most favorable. Such rules might not be as advantageous (or even applicable) of the selected predictive models are not operable to provide posterior probability estimates.

Figure 6A:
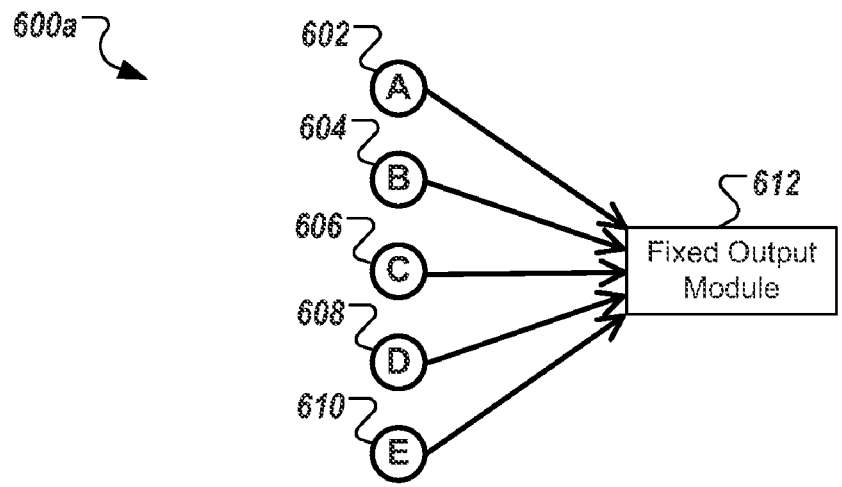
FIGS. 6A and 6B illustrate suitable directed graphs for implementing respective combining rules.
Figure 6B:
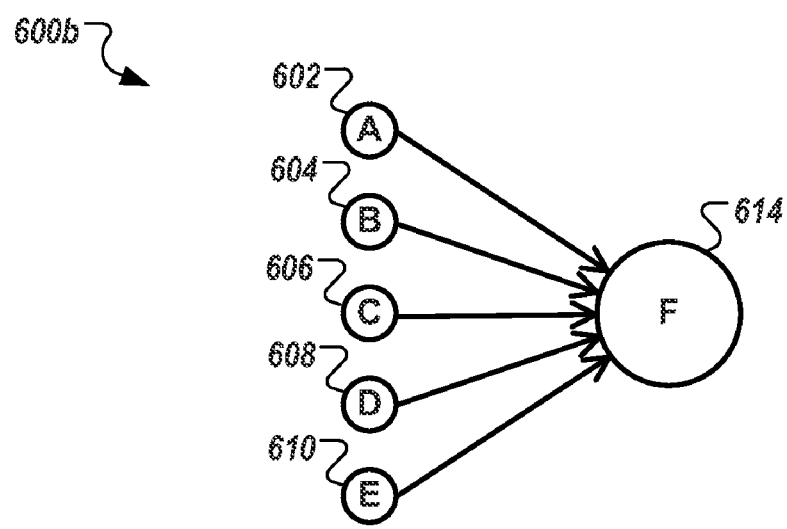

In some examples, the combining technique can include a directed graph (e.g., a directed acyclic graph) prescribing an order for executing a subset of selected predictive models. FIGS. 6A and 6B illustrate suitable directed graphs for implementing respective combining rules. For example, FIG. 6A shows a graph 600a for implementing an arbitrary fixed output combining rule. Nodes A 602, B 604, C 606, D 608, and E 610 represent respective implementations of selected predictive models that can be executed in parallel based on a received feature vector. Element 612 represents a decision maker module for applying the fixed output combining rule to achieve a final prediction. FIG. 6B shows a graph 600b for implementing an arbitrary trained combining rule. Again, nodes A 602, B 604, C 606, D 608, and E 610 represent respective implementations of selected and trained first layer predictive models that can be executed in parallel based on a received feature vector. In this example, however, output from the first layer predictive models serves as input to an implementation of a second layer predictive model represented by node F 614. As described above, the second layer predictive model can be operable to provide a final prediction based on an intermediate query including output from the first layer predictive models.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method, comprising:
   storing, at a server system, a set of previously trained predicative models;
   storing, at the server system, a respective performance indicator associated with each predictive model in the set of predictive models, where each of the respective performance indicators comprises a quantifiable metric determined based on prior usage data corresponding to the associated predictive model;
   receiving, at the server system, a first feature vector from a first remote computing device, the first feature vector comprising one or more elements;
   identifying, using the server system, an element type for each of the one or more elements of the first feature vector;
   selecting, using the server system, a first subset of predictive models from the set of predictive models, where the selection is based on the identified element types of the first feature vector and the stored performance indicators associated with the predictive models of the set;
   processing the first feature vector using the first subset of predictive models, each predictive model of the first subset of predictive models generating a respective predictive output based on the first feature vector to provide a first plurality of predictive outputs;
   generating a first combined predictive output based on the first plurality of predictive outputs;
   in response to generating the first combined predictive output, evaluating a performance of at least one predictive model of the subset; and
   updating the performance indicator associated with the at least one predictive model based on the evaluated performance.

2. The method of claim 1, wherein generating a first combined predictive output comprises:
   defining a combining technique based on the first subset of predictive models; and
   combining the first plurality of predictive outputs according to the combing technique.

3. The method of claim 2, wherein the combining technique comprises a fixed output combining rule.

4. The method of claim 2, wherein the combining technique comprises a trained combining rule.

5. The method of claim 2, wherein the combining technique is defined as a directed acyclic graph.

6. The method of claim 1, wherein each predictive output of the first plurality of predictive outputs is equally weighted when generating the first combined predictive output.

7. The method of claim 1, wherein the first combined predictive output is generated using a decision maker, the decision maker receiving the first plurality of predictive outputs.

8. The method of claim 1, wherein the first plurality of outputs are combined to define a combined feature vector, the combined feature vector being processed by a combining predictive model to generate the combined predictive output.

9. The method of claim 1, wherein selecting a first subset of one or more predictive models comprises comparing respective performance indicators associated with each predictive model of the set of predictive models, the respective performance indicators being selected for comparison based on the element types of the first feature vector.

10. The method of claim 9, wherein comparing respective performance indicators comprises comparing accuracy metrics.

11. The method of claim 1, wherein processing the first feature vector comprises submitting at least a portion of the first feature vector to each predictive model of the first subset of predictive models in parallel.

12. The method of claim 1, wherein processing the first feature vector comprises submitting the entire first feature vector to each predictive model of the first subset of predictive models.

13. The method of claim 1, wherein processing the first feature vector comprises submitting elements of a first type to a first predictive model of the first subset of predictive models and submitting elements of a second type to a second predictive model of the first subset of predictive models.

14. The method of claim 1, further comprising:
   receiving, at the server system, a second feature vector from a second remote computing device, the second feature vector comprising one or more elements;
   identifying, using the server system, an element type for each of the one or more elements of the second feature vector;
   selecting, using the server system, a second subset of predictive models from the set of predictive models, where the selection is based on the identified element types of the second feature vector and the stored performance indicators associated with the predictive models of the set, wherein the second subset of predictive models is different than the first subset of predictive models, and wherein the stored performance indicators comprise the updated performance indicator;
   processing the second feature vector using the second subset of predictive models, each predictive model of the second subset of predictive models generating a respective predictive output based on the second feature vector to provide a second plurality of predictive outputs; and
   generating a second combined predictive output based on the second plurality of predictive outputs.

15. A computer storage medium encoded with a computer program, the program comprising instructions that when executed by one or more computers cause the one or more computers to perform operations comprising:
   storing a set of previously trained predicative models;
   storing a respective performance indicator associated with each predictive model in the set of predictive models, where each of the respective performance indicators comprises a quantifiable metric determined based on prior usage data corresponding to the associated predictive model;

receiving a first feature vector from a first remote computing device, the first feature vector comprising one or more elements;

identifying an element type for each of the one or more elements of the first feature vector;

selecting a first subset of one or more predictive models from the stored set of predictive models, where the selection is based on the identified element types of the first feature vector and the stored performance indicators associated with the predictive models of the set;

processing the first feature vector using the first subset of predictive models, each predictive model of the first subset of predictive models generating a respective predictive output based on the first feature vector to provide a first plurality of predictive outputs;

generating a first combined predictive output based on the first plurality of predictive outputs;

in response to generating the first combined predictive output, evaluating a performance of at least one predictive model of the subset; and updating the performance indicator associated with the at least one predictive model based on the evaluated performance.

16. The computer storage medium of claim 15, wherein the program instructions cause the one or more computers to perform operations further comprising:

receiving, a second feature vector from a second remote computing device, the second feature vector comprising one or more elements;

identifying an element type for each of the one or more elements of the second feature vector;

selecting a second subset of predictive models from the stored set of predictive models, where the selection is based on the identified element types of the second feature vector and the stored performance indicators associated with the predictive model of the set, wherein the second subset of predictive models is different than the first subset of predictive models, and wherein the stored performance indicators comprise the updated performance indicator;

processing the second feature vector using the second subset of predictive models, each predictive model of the second subset of predictive models generating a respective predictive output based on the second feature vector to provide a second plurality of predictive outputs; and generating a second combined predictive output based on the second plurality of predictive outputs.

17. A system, comprising:

one or more computing devices; and one or more computer-readable media coupled to the one or more computing devices and having instructions stored thereon which, when executed by the one or more computing devices, cause the one or more computing devices to perform operations comprising:

storing a set of previously trained predicative models;

storing a respective performance indicator associated with each predictive model in the set of predictive models, where each of the respective performance indicators comprises a quantifiable metric determined based on prior usage data corresponding to the associated predictive model;

receiving a first feature vector from a first remote computing device, the first feature vector comprising one or more elements;

identifying an element type for each of the one or more elements of the first feature vector;

selecting a first subset of one or more predictive models from the stored set of predictive models, where the selection is based on the identified element types of the first feature vector and the stored performance indicators associated with the predictive models of the set;

processing the first feature vector using the first subset of predictive models, each predictive model of the first subset of predictive models generating a respective predictive output based on the first feature vector to provide a first plurality of predictive outputs;

generating a first combined predictive output based on the first plurality of predictive outputs;

in response to generating the first combined predictive output, evaluating a performance of at least one predictive model of the subset; and updating the performance indicator associated with the at least one predictive model based on the evaluated performance.

18. The system of claim 17, wherein the stored instructions cause the one or more computers to perform operations further comprising:

receiving, a second feature vector from a second remote computing device, the second feature vector comprising one or more elements;

identifying an element type for each of the one or more elements of the second feature vector;

selecting a second subset of predictive models from the stored set of predictive models, where the selection is based on the identified element types of the second feature vector and the stored performance indicators associated with the predictive model of the set, wherein the second subset of predictive models is different than the first subset of predictive models, and wherein the stored performance indicators comprise the updated performance indicator;

processing the second feature vector using the second subset of predictive models, each predictive model of the second subset of predictive models generating a respective predictive output based on the second feature vector to provide a second plurality of predictive outputs; and generating a second combined predictive output based on the second plurality of predictive outputs.

* * * * *